No. 837,728. PATENTED DEC. 4, 1906.
F. H. REID.
MILK AND CREAM SEPARATOR.
APPLICATION FILED APR. 16, 1906.
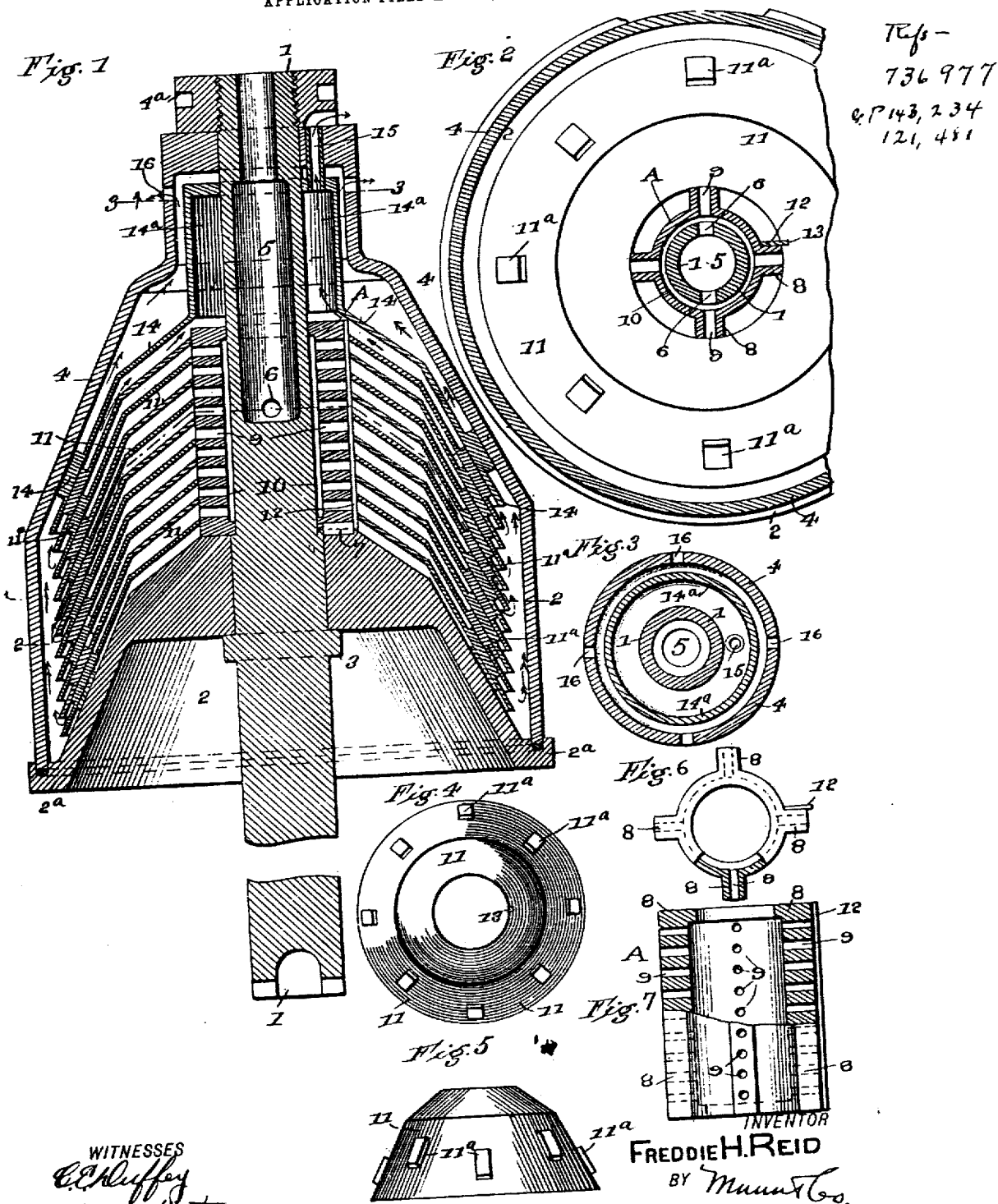
WITNESSES
INVENTOR
FREDDIE H. REID
BY
ATTORNEYS

UNITED STATES PATENT OFFICE.

FREDDIE H. REID, OF SIOUX CITY, IOWA.

MILK AND CREAM SEPARATOR.

No. 837,728.     Specification of Letters Patent.     Patented Dec. 4, 1906.

Application filed April 16, 1906. Serial No. 311,924.

*To all whom it may concern:*

Be it known that I, FREDDIE H. REID, a citizen of the United States, and a resident of Sioux City, in the county of Woodbury and State of Iowa, have invented a new and Improved Milk and Cream Separator, of which the following is a specification.

My invention is an improvement in centrifugal separators in which a so-called "liner," comprising a series of metal shells of approximately conical form, are arranged within a drum or inverted bowl and the whole mounted upon a rotatable shaft, the full-milk from which the cream is to be separated being admitted at the center of the cones and distributed radially between them, the separation of the cream being effected by centrifugal action and the two liquids being drawn off from the drum or bowl at separate orifices or spouts.

The novel features of the invention are hereinafter described, and specifically indicated in the claims.

In the accompanying drawings, Figure 1 is a central longitudinal section of my improved separator. Fig. 2 is a cross-section on the line 2 2 of Fig. 1. Fig. 3 is a cross-section on the line 3 3 of Fig. 1. Fig. 4 is a plan view of one of the cones or cone-forms. Fig. 5 is a side view of the same. Fig. 6 is a top view, part being broken away, of my improved milk-distributer. Fig. 7 is in part a side view and in part a vertical section of the distributer.

The separator proper is mounted upon a vertical shaft 1, which in practice is stepped and journaled in a suitable frame and provided with a band pulley or gear to adapt it to be driven at the requisite speed by a motor of any preferred kind. The base 2 of the separator has an approximately concavo-convex form and is supported upon a shaft-collar 3. The drum or bowl 4, which is approximately conical in form, is seated upon the rim 2ª of the base 2 and in a groove provided with elastic packing. A nut 4ª is screwed upon the upper end of the shaft 1 and bears upon the adjacent end of the drum 4, whereby the latter is pressed firmly upon the base 2 and the latter in turn upon the collar 3. Within this drum or bowl 4 are contained the parts by which separation of the cream from the milk is effected. The upper end of the shaft 1 is hollow, and the full-milk—that is to say, the milk containing the cream which is to be separated from it—is received into the elongated chamber 5 thus provided, and from the latter it is distributed through lateral holes 6. (See Figs. 1 and 2.)

My improved distributer A (see Figs. 1, 2, 6, 7) surrounds the portion of the shaft immediately above the base 2 and rests upon the latter, to which it is keyed at 7 (see Fig. 1)—that is to say, a key is inserted in registering slots or notches provided in the adjacent portions of the base 2 and distributer A. The distributer has a hollow cylindrical body and a series of lateral ribs 8, which are each provided with a vertical row of holes 9. The vertical projections or ribs are preferably four in number, so that milk is discharged from the distributer A at four points. The chamber formed within the body of the distributer A has a greater diameter than the portion of the shaft to which it is applied, as will be apparent from an inspection of Figs. 1 and 7. In other words, the end openings in the body of the distributer have the same diameter as the shaft, and thus fit it closely, while an annular chamber 10 (see Figs. 1 and 2) is formed around the shaft. Into this chamber the milk discharges from the hole 6 in the shaft, and the chamber thus serves as a primary collector from which the flow or distribution of milk to the several rows of openings 9 occurs. Surrounding the distributer is a series of approximately concavo-convex plates 11, the same constituting the liner, which is a well-known element in separators of this character.

As shown in Fig. 5, the upper ends of the separator-plates are formed at an obtuse angle to the body or main portion thereof, whereby the mingled milk and cream discharged from the distributer A are suddenly diverted from the lateral course downward. Blocks 11ª are applied to the body or main portion of the plates 11, as shown in Figs. 4, 5, and these serve to separate them from each other, as will be understood by reference to Fig. 1.

As shown in Figs. 1 and 2, one of the lateral ribs 8 of the distributer A is provided with a vertical flange 12, which projects laterally beyond the said rib, and is thus adapted to serve as a key for preventing the several separator-plates 11 from rotating on the distributer. Thus, as shown in Fig. 4, each of the separator-plates has a notch in its upper end, as shown at 13, Fig. 4, adapted to receive the key or flange 12, and it will be understood that when the distributer A has been applied to the shaft and keyed to the base 2, as before described, the several separator-plates are passed downward successively over the upper end of the shaft and the distributer, the slots 13 in said separator-plates being brought into coincidence or register with the key or flange 12 of the distributer, the separator-plates thus sliding down into place, as will be readily understood.

Above the several separator-plates 11, constituting the liner, is arranged a similar separator-plate 14, (see Fig. 1,) the same serving in function as a cream-collector. The upper end of such cream-collector is constructed as a hood or cylinder 14$^a$, surrounding the shaft 1 and forming an annular chamber into which the cream passes and from which it escapes through a small tube 15, arranged in the head of the casing or drum 4. This tube 15 further serves as a means for readily connecting the cream-collector 14 with the casing 4. Thus all the parts supported upon and attached to the shaft, as has been described, are detachably connected therewith, but fixed in position so as to revolve with it. By removing the nut 4$^a$ the casing and stream-collector 14, attached thereto, may be readily removed and then the separator-plates 11 and the distributer A.

As has been already substantially indicated, the full-milk is delivered into the chamber 5 of the shaft 1 and passes thence through the holes 6 into the annular distributing-chamber 10, formed between the shaft and the apertured portion of the distributer A. Thence it discharges laterally through all the holes 9, provided in the several vertical ribs 8 of the distributer, and is thus led directly into the spaces between the separator-plates 11. The further or more complete separation of the cream from the milk is effected as they pass downward in the spaces between the separator-plates and discharge therefrom against the surrounding casing or drum 4. The difference of specific gravity of the two liquids—cream and milk—insures that the milk, being the heavier, will accumulate and form a layer in contact with the inner side of the drum 4, and the cream will form another layer inside the milk layer and in contact therewith. The gravity of the milk flowing from chamber 5 will cause these separated liquids—cream and milk—to flow upward, the milk, owing to its greater specific gravity, flowing along the wall of the drum 4 and escaping at the lateral orifices 16 formed in the head thereof, while the cream, passing into the collector 14 and between the same and the adjacent top plate into the hood 14$^a$, discharges through the tube 15. The courses of the separated liquids—cream and milk—are respectively indicated in Fig. 1 by single-headed and double-headed arrows.

What I claim is—

1. The improved milk and cream separator comprising a vertical shaft provided with a collar, and in its upper portion with a chamber 5 having lateral openings at the base, a convex base 2 seated upon the collar and having a flanged rim, a distributer surrounding the apertured portion of the shaft but separated therefrom to form an annular collecting-chamber and provided with a vertical flange 12, separator-plates 11 arranged one over the other and the top plate 14 having an upper extended portion constituting a cream-collecting hood with discharge-outlet 15, a casing or drum 4 seated upon the base 2 and having a milk-discharge outlet at the top, and a nut screwed upon the upper portion of the shaft whereby all the parts constituting the separator proper are held detachably on the shaft, substantially as described.

2. The improved milk and cream separator comprising a vertical shaft having a collar 3, a convex base 2 supported upon the collar, a casing 4 seated upon the flange or rim of the base and provided at the top with an aperture for receiving the head of the shaft and also with a lateral milk-discharge opening, means for holding the casing in place, and the separating means proper inclosed by the casing, the same consisting of the distributer A surrounding the shaft and having lateral discharge-openings, concavo-convex separator-plates extending downward from the distributer, the top plate 14 having an extended vertical and chambered portion for receiving the cream and a top discharge-passage 15, substantially as described.

3. In a separator of the class indicated, the combination, with a vertical shaft having a chamber 5 with lateral discharge-openings, of a distributer surrounding the chambered portion of the shaft, separator-plates arranged thereon and the top separator-plate provided with the upwardly-extended chambered portion constituting a cream-collector, and the convex base, and hollow casing 4 supported thereon and inclosing the other specified parts of the separator proper, substantially as described.

FREDDIE H. REID.

Witnesses:
HARRY B. LEAR,
RAY WEINENSKIRCH.